United States Patent [19]
Stultz et al.

[11] Patent Number: 5,654,973
[45] Date of Patent: Aug. 5, 1997

[54] LASER SYSTEM USING $Co^{2+}$-DOPED CRYSTAL Q-SWITCH

[75] Inventors: Robert D. Stultz, Huntington Beach; Milton Birnbaum, Rancho Palos Verdes, both of Calif.; Marly B. Camargo, Sao Paulo, Brazil; Milan Kokta, Washougal, Wash.

[73] Assignee: Hughes Electronics, Los Angeles, Calif.

[21] Appl. No.: 330,494

[22] Filed: May 5, 1995

[51] Int. Cl.$^6$ ............................................. H01S 3/11
[52] U.S. Cl. .............................................. 372/10; 372/11
[58] Field of Search ................................ 372/10, 11, 40, 372/41

[56] References Cited

U.S. PATENT DOCUMENTS 5,388,114  2/1995  Zarrabi et al. ..................... 372/40

OTHER PUBLICATIONS

Marvin J. Weber, "CRC Handbook of Laser Science and Technology," CRC Press, pp. 200–207 (1991). no month.

V.P. Mikhailov et al., "Picosecond Spectroscopy of Excited States in Transition–Metal–Ion Doped New Laser Materials," *OSA Proceedings on Advanced Solid–State Lasers*, vol. 15, pp. 320–324 (1993). no month.

*Primary Examiner*—Rodney B. Bovernick
*Assistant Examiner*—Robert E. Wise
*Attorney, Agent, or Firm*—Michael W. Sales; Wanda K. Denson-Low

[57] ABSTRACT

A laser system includes a laser resonator cavity having a resonant axis and a lasing element within the laser resonator cavity. The lasing element emits, under stimulation, light at a wavelength of from about 0.95 to about 1.65 micrometers. There is a flash lamp which optically pumps the lasing element to emit light. A Q-switch crystal lies along the resonant axis within the laser resonator cavity. The Q-switch crystal is formed of a host material having a concentration of $Co^{2+}$ ions therein, so as to be a saturable absorber of light of a wavelength of from about 0.95 to about 1.65 micrometers. The Q-switch crystal is preferably $Co^{2+}$-doped yttrium-scandium-gallium garnet or $Co^{2+}$-doped yttrium-aluminum garnet.

20 Claims, 3 Drawing Sheets

LASER SYSTEM USING CO$^{2+}$-DOPED CRYSTAL Q-SWITCH

BACKGROUND OF THE INVENTION

This invention relates to lasers, and, more particularly, to a laser system having a passive Q-switch.

A laser is a device that emits a spatially coherent beam of light of a specific wavelength. In a laser, a lasing element is placed within a laser resonator cavity and pumped with an energy source such as a flash lamp. The pumping action produces stored energy and gain within the lasing element. When the gain exceeds the losses so that there is a net light amplification per round trip of the light in the resonator cavity, laser light begins to build up in the cavity, and stored energy is extracted from the lasing element. This energy can be released in the form of a very short, intense light pulse by using a device called a Q-switch.

A Q-switch operates by initially increasing the cavity losses, thus preventing lasing action, while an amount of stored energy and gain is achieved that greatly exceeds the losses that would otherwise exist. The Q-switch losses are then quickly lowered, producing a large net amplification in the cavity, and an extremely rapid buildup of laser light occurs. The light pulse begins to decay after the stored energy in the lasing element has been depleted such that the gain once again drops below the cavity losses.

The Q-switch can be an active device which is controlled or driven by an external signal. The Q-switch can also be a passive structure that has no external control, but instead operates periodically as a result of its own properties. The present invention relates to a laser system using such a passive Q-switch.

A saturable absorber can be used as a passive Q-switch. The saturable absorber is a crystal having transmittance properties that vary as a function of the intensity of the incident light that falls upon the crystal. When light of low intensity is incident upon the saturable absorber, its light transmittance is relatively low, resulting in high cavity losses. As the incident light energy increases due to the buildup of energy within the laser resonator cavity, the light transmittance of the crystal increases. At some point, the light transmittance increases to a level such that the crystal "bleaches", i.e., becomes transparent, so that the cavity losses become low, and an intense Q-switched light pulse is emitted.

A significant limitation on the performance of saturable absorber Q-switch materials is their susceptibility to damage resulting from passage therethrough of an intense light beam. As indicated, the passive Q-switch causes the buildup of intense light within the laser resonator cavity. When the Q-switch crystal bleaches and the light pulse passes therethrough, the crystal may be damaged by the intense light, so that the ability of the crystal to function as a saturable absorber for subsequent cycles is impaired.

The properties of a saturable absorber crystal depend upon the wavelength of the incident light. A crystal which performs as a saturable absorber at one wavelength typically will not perform in the same manner at significantly different wavelengths. Further, a crystal may act as a saturable absorber for relatively low incident intensities, but higher intensities may damage the crystal. There is therefore an ongoing search for effective saturable absorber crystals for use as Q-switches in particular wavelength ranges, and which are robust (i.e., have high damage thresholds).

One of the laser operating ranges of interest is at about 1.5 micrometers wavelength. This wavelength range is of particular interest because light in this range will not damage the human eye at moderate intensities. For example, the Er:glass laser emits light at about 1.53 micrometers wavelength, and is of interest as an eye-safe laser. (In this accepted notation, A:B indicates a material having an ion of A doped into a B host crystal.) In the past, Q-switching of the Er:glass laser has been accomplished by an active, rotating prism Q-switch. Passive Q-switches of the saturable absorber type, with a satisfactorily high damage threshold, are not known.

Saturable absorbers that can be used as passive Q-switches operating in the 1.5 micrometer wavelength range are also known. Examples include $Er^{3+}:Ca_5(PO_4)_3F$, $U^{2+}CaF_2$, $U^{2+}BaF_2$, $U^{2+}:SrF_2$, and $Er^{3+}:CaF_2$. However, these fluoride-based materials have been observed to have relatively low damage thresholds. They are thus operable as Q-switches in laser systems to produce only relatively low-intensity external laser beams.

There is a need for saturable absorbers operable in the 1.5 micrometer wavelength range, which are robust and resistant to damage from the passage therethrough of a high-intensity laser beam. The present invention fulfills this need, and further provides related advantages.

SUMMARY OF THE INVENTION

The present invention provides a laser system having a passive Q-switch. The laser system can produce relatively high-intensity output pulses of very short duration and high repetition rate. The Q-switch material is operable over a range of wavelengths at about 1.5 micrometers, and is therefore operable with a number of types of lasing elements.

In accordance with the invention, a laser system comprises a laser resonator cavity having a resonant axis and a lasing element within the laser resonator cavity. The lasing element emits, under stimulation, light at a wavelength within the range of about 0.95 to about 1.65 micrometers. (This range is within the scope of the term "about 1.5 micrometers" as used herein.) There is means for optically pumping the lasing element, such as a flash lamp. A Q-switch crystal lies along the resonant axis within the laser resonator cavity. The Q-switch crystal comprises a host material having a concentration of $Co^{2+}$ ions therein, the Q-switch crystal being a saturable absorber of light of a wavelength of from about 0.95 to about 1.65 micrometers.

The Q-switch crystal utilizes $Co^{2+}$ saturable absorber ions in a host material, preferably a garnet-type crystal. The preferred crystals include $Co^{2+}$-doped yttrium-scandium-gallium garnet (termed Co:YSGG) and $Co^{2+}$-doped yttrium-aluminum garnet (termed Co:YAG). These materials act as saturable absorbers and can be used as Q-switches at about 1.5 micrometers wavelength, and have high damage thresholds in this range.

The present invention provides an important advance in the art of passive Q-switched laser systems. It provides a high-intensity, eye-safe passive Q-switch pulsed laser operating in the range of about 0.95 to about 1.65 micrometers light wavelength. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
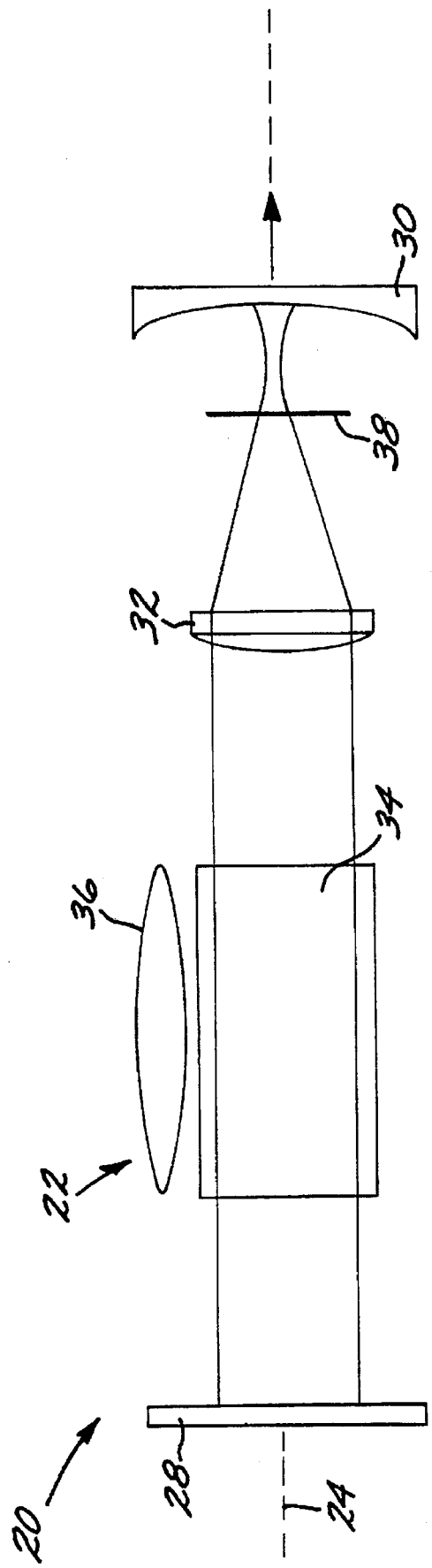
FIG. 1 is a schematic drawing of a laser system according to the invention.

FIG. 1 schematically illustrates a laser system 20 according to the present invention. The laser system 20 includes a laser resonator cavity 22 having a resonant axis 24. At a first end of the cavity 22 is a flat mirror 28, which has a reflectivity of substantially 100 percent. At a second end of the cavity is a curved outcoupler mirror 30 having a reflectivity that is less than 100 percent. A focusing lens 32 is optionally provided adjacent to the second end of the cavity.

A lasing element 34 is positioned within the laser resonator cavity 22. The lasing element 34 is in the form of a cylindrical solid rod whose cylindrical axis coincides with the resonant axis 24. When stimulated, the lasing element 34 emits coherent light having a wavelength in a range at about 1.5 micrometers, and more specifically from about 0.95 to about 1.65 micrometers. Examples of materials operable in such a lasing element 34 include Er:glass (erbium doped into a phosphate glass host), $Tm^{3+}$:YLF (thulium doped into a yttrium-lithium fluoride host, Nd:YAG (neodymium doped into a yttrium-aluminum garnet host), and $Er^{3+}$:YAG (erbium doped into a yttrium-aluminum garnet host). These lasing elements are all known in the art.

A means for optically pumping the lasing element is provided. In this case, a linear flash lamp 36 is positioned adjacent to the lasing element 34.

A Q-switch crystal 38 is positioned within the laser resonator cavity 22 with the resonant axis 24 passing therethrough. The Q-switch crystal 38 lies between the lasing element 34 and the curved outcoupler mirror 30. In the present design, the Q-switch crystal 38 lies between the focusing lens 32 and the curved outcoupler mirror 30, so that the resonant light beam is focused into the Q-switch crystal 38 by the focusing lens 32. The Q-switch crystal 38 is a saturable absorber of light in the wavelength range at about 1.5 micrometers, and more specifically from about 0.95 to about 1.65 micrometers.

The Q-switch crystal 38 is formed of a host material with a sufficient concentration of $Co^{2+}$ ions therein to act as a saturable absorber in the wavelength range of from about 0.95 to about 1.65 micrometers. The Q-switch material desirably has a higher absorption cross section, preferably a much higher absorption cross section, than the stimulated emission cross section of the lasing element 34.

The host material is preferably a garnet defined by its $A_3B_5O_{12}$ garnet crystal structure. The garnet structure is well known, and is described, for example, in A. A. Kaminskii, "Laser Crystals", Springer Series in Optical Sciences, D. L. MacAdam, ed., Springer-Verlag, Berlin, pages 400–402 (1981).

Most preferably, the Q-switch crystal 38 is $Co^{2+}$:$Y_3Sc_2Ga_3O_{12}$, which may also be described as $Co^{2+}$-doped yttrium-scandium-gallium garnet, or Co:YSGG for brevity; or the crystal 38 is $Co^{2+}$:$Y_3Al_5O_{12}$, which may also be described as $Co^{2+}$-doped yttrium-aluminum garnet, or Co:YAG for brevity. The cobalt content can be varied in conjunction with the physical length of the crystal 38 to tune the performance of the Q-switch and the laser system.

Other types of garnet hosts may also be utilized as a host for the $Co^{2+}$ ions. Examples include GGG (gadolinium gallium garnet), GSAG (gadolinium scandium aluminum garnet), and GSGG (gadolinium scandium gallium garnet.

The $Co^{2+}$ ions may also be placed into other hosts such as fluorides (e.g., $MgF_2$, $CaF_2$) and glasses (e.g., fluoride glasses, phosphate glasses, and silicate glasses).

A laser system 20 like that in FIG. 1 was built and operated to demonstrate the performance of the Q-switched laser system. The laser resonator cavity was about 23.5 centimeters long. The flat mirror had a 100 percent reflectance. The curved outcoupler mirror had a 2.5 centimeter radius of curvature and a reflectance of 94 percent at a wavelength of about 1.53 micrometers. The converging lens had a focal length of 5 centimeters, and was positioned to provide a beam waist near the Q-switch crystal. This configuration is a stable resonator.

The lasing element used for the demonstration was a Kigre QE-7S Er:glass rod, having a diameter of 4 millimeters and a length of 76 millimeters. Other lasing elements In the 0.95–1.65 micrometer range would also be operable. The flash lamp produced a flash lamp pulse of about 600 microseconds full width at half maximum.

The laser system was operated with both Co:YSGG and Co:YAG Q-switch crystals. The preferred Co:YSGG crystal was prepared by the Czochralski method. A 1400 gram charge of the host YSGG material with about 2 atomic percent cobalt was prepared. Silicon in an equal atomic percent, in this case about 2 atomic percent, was added for charge compensation. The charge was placed into a 3 inch by 3 inch crucible with an atmosphere of nitrogen plus 1500 parts per million oxygen. The crystal growth rate was 1 millimeter per hour and the rotation rate was 10 revolutions per minute. The crystal boule was 1.3 inches in diameter and 6 inches long, grown with a <111> crystal orientation from a seed of undoped <111> YSGG. After growth, the boule was cut into a 0.5 millimeter thick slice with the faces perpendicular to the <111> direction, and the faces were polished but left uncoated. The faces were aligned perpendicular to the resonant axis in the laser system.

The Co:YAG crystal was prepared similarly.

Figure 2:
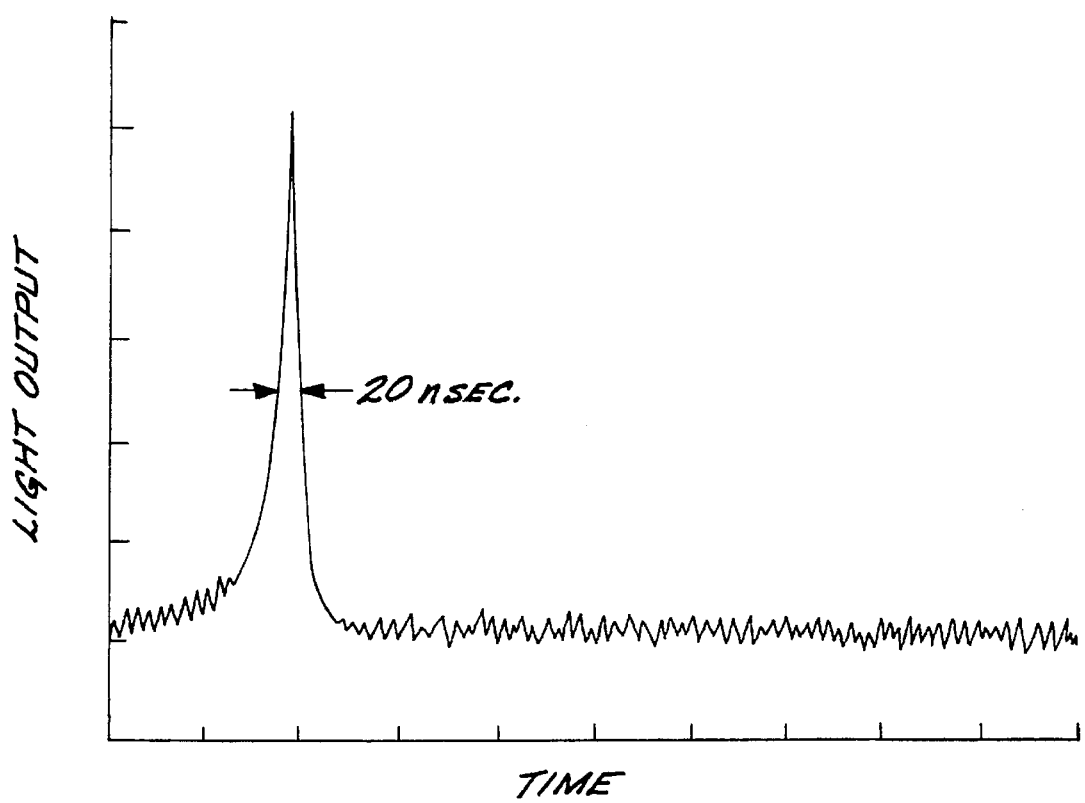
FIG. 2 is an oscilloscope trace of a pulse light output as a function of time for the laser system of FIG. 1, using a Co:YSGG Q-switch.

FIG. 2 is an oscilloscope trace of the light output of the laser system as a function of time using the Co:YSGG Q-switch crystal, for a single output pulse. The output pulse had a full width at half maximum of about 20 nanoseconds. The output pulse had an energy at half maximum of 4 milliJoules. The output pulse had a wavelength of 1.532 micrometer. By comparison, when the laser was operated without the Q-switch in a free-running mode, its output wavelength was 1.534 micrometers.

The results obtained when the laser system was operated with the Co:YAG crystal were similar, except that the shortest pulse that could be obtained without damage was 88 nanoseconds with an output energy of less than 1 milliJoule.

Figure 3:
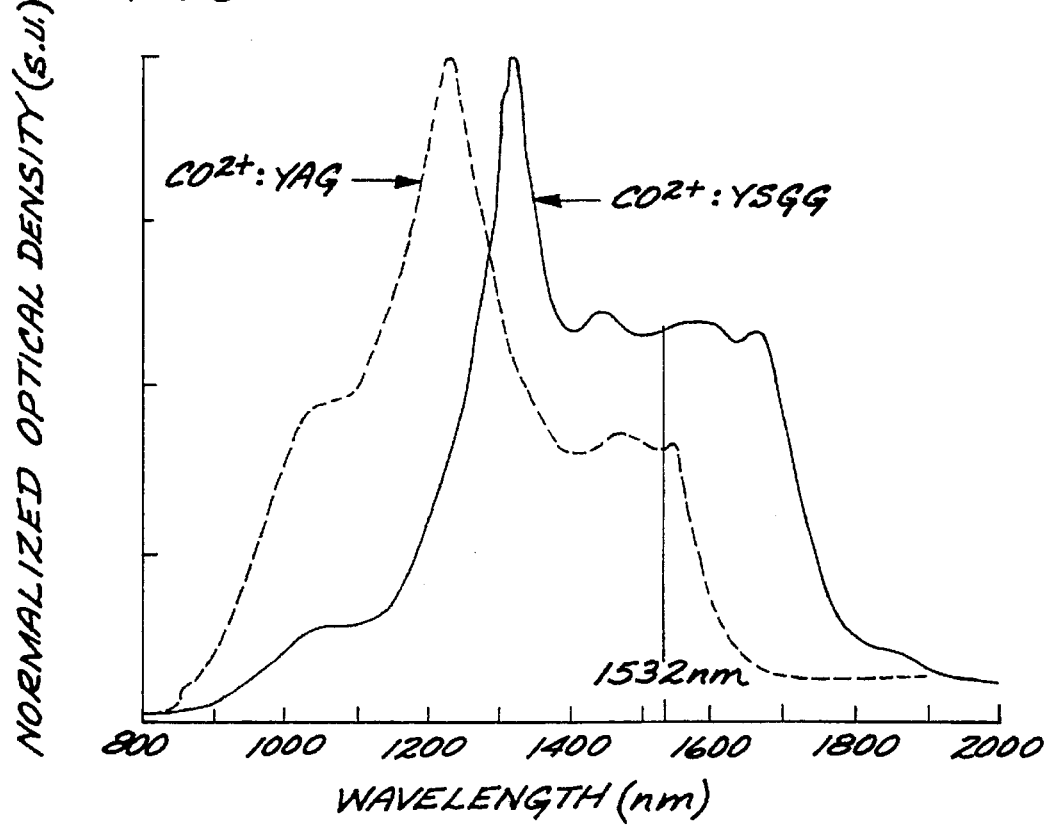
FIG. 3 is graph illustrating the absorption spectra of Co:YSGG and Co:YAG in the wavelength range of interest.

To verify the operability of the Co-doped garnets for use as a passive Q-switch over a range of wavelengths, absorption spectra of Co:YSGG and Co:YAG were measured at ambient temperature. The results are shown in FIG. 3.

Figure 4:
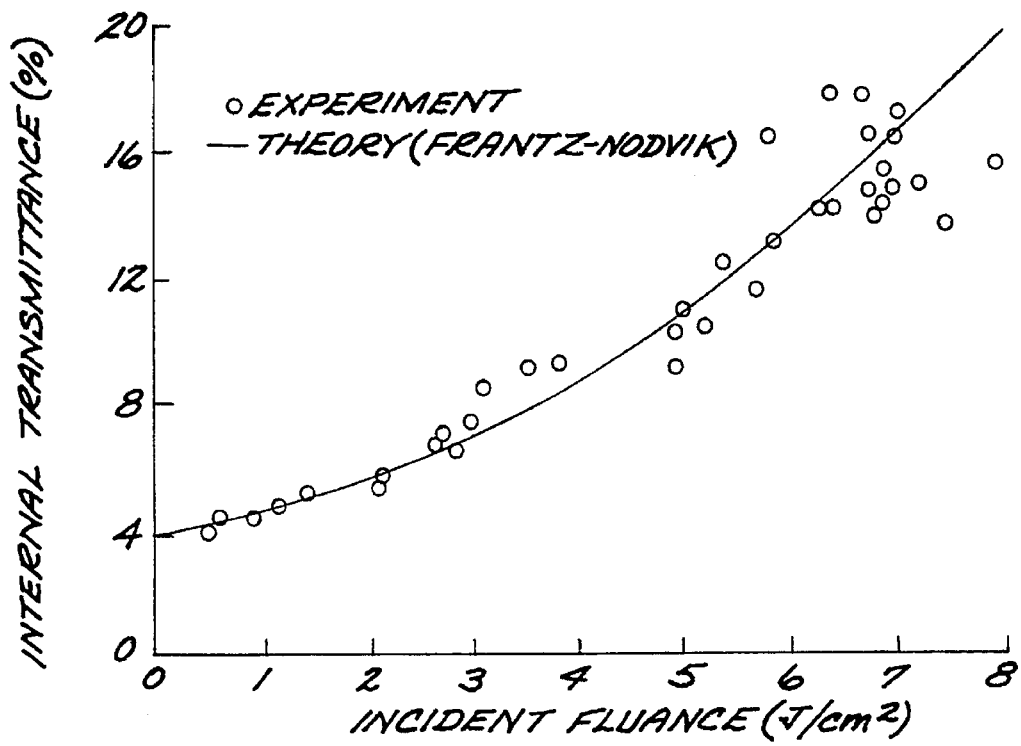
FIG. 4 is a graph illustrating the transmittance as a function of incident fluence for Co:YSGG.
Figure 5:
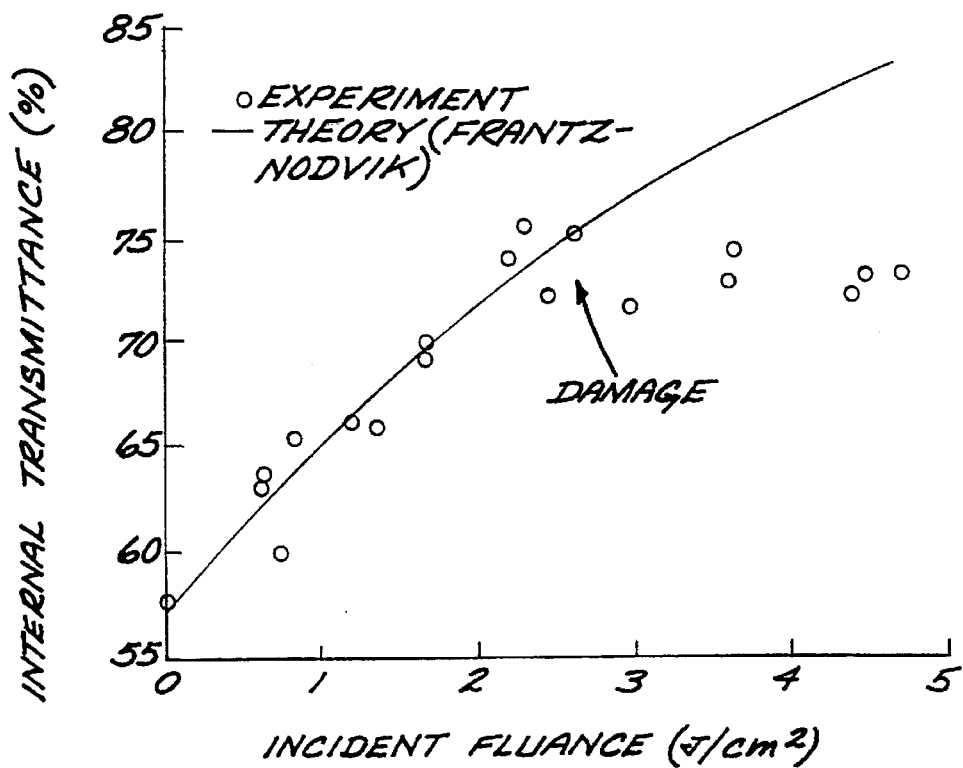
FIG. 5 is a graph illustrating the transmittance as a function of incident fluence for Co:YAG.

The saturation behavior of the Co-doped garnets was measured using a Raman-shifted Nd:YAG laser operating at 1.543 micrometers. The results for Co:YSGG and Co:YAG are shown in FIGS. 4 and 5, respectively. The Co:YSGG material was not damaged by a fluence of 8 Joules per square centimeter, indicating a high damage threshold. The Co:YAG crystal began to experience some damage at 2.5 Joules per square centimeter, and is therefore operable but less robust than the Co:YSGG material.

The results indicate that these Co-doped garnets can be used as saturable absorbers, and thence as Q-switch crystals, over the wavelength range of from about 0.95 to about 1.65 micrometers. More precisely, the operable range for Co:YSGG is from about 1.0 to about 1.7 micrometers, and the operable range for Co:YAG is from about 0.9 to about 1.6 micrometers, but these ranges are here understood to fall within the range "from about 0.95 to about 1.65 micrometers", as used herein. Thus, these materials can be used with a variety of lasing elements such as Er:glass (1.53 micrometers wavelength), $Tm^{3+}$:YLF (1.45 micrometers wavelength), Nd:YAG (1.34 micrometers wavelength), and $Er^{3+}$:YAG (1.64 micrometers wavelength), as well as other lasing elements that produce light in this wavelength range. Examples of other operable lasing elements are listed in Marvin J. Weber, ed., "CRC Handbook of Laser Science and Technology", CRC Press, pages 200–207 (1991), whose disclosure is incorporated by reference.

The present invention thus provides a laser system with a passive Q-switch having a high damage threshold, operating in the range of about 0.95 to about 1.65 nanometers light wavelength. Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A laser system, comprising:

a laser resonator cavity having a resonant axis;

a lasing element within the laser resonator cavity, the lasing element emitting, under stimulation, light at a wavelength of from about 0.95 to about 1.65 micrometers;

means for optically pumping the lasing element; and a Q-switch crystal lying along the resonant axis within the laser resonator cavity, the Q-switch crystal comprising a host material having a sufficient concentration of $Co^{2+}$ ions doped therein to thereby provide a saturable absorber of light of a wavelength of from about 0.95 to about 1.65 micrometers which produces a Q-switch function.

2. The laser system of claim 1, wherein the laser resonator cavity comprises a flat mirror at a first end thereof, the flat mirror having a reflectivity of substantially 100 percent; and a curved outcoupler mirror at a second end thereof, the curved mirror having a reflectivity of less than 100 percent, and wherein the Q-switch crystal is positioned between the lasing element and the curved mirror.

3. The laser system of claim 2, further including a converging lens positioned between the lasing element and the Q-switch crystal.

4. The laser system of claim 1, wherein the lasing element comprises a glass host material.

5. The laser system of claim 1, wherein the Q-switch crystal host material comprises glass.

6. The laser system of claim 1, wherein the Q-switch crystal comprises $Co^{2+}$-doped garnet.

7. The laser system of claim 1, wherein the Q-switch crystal comprises $Co^{2+}$-doped yttrium-scandium-gallium garnet.

8. The laser system of claim 1, wherein the Q-switch crystal comprises $Co^{2+}$-doped yttrium-aluminum garnet.

9. A laser system, comprising:

a laser resonator cavity having a resonant axis;

a lasing element within the laser resonator cavity;

means for optically pumping the lasing element; and a Q-switch crystal lying along the resonant axis within the laser resonator cavity, the Q-switch crystal comprising a saturable absorber selected from the group consisting of $Co^{2+}$-doped yttrium-scandium-gallium garnet and $Co^{2+}$-doped yttrium-aluminum garnet.

10. The laser system of claim 9, wherein the laser resonator cavity comprises a flat mirror at a first end thereof, the flat mirror having a reflectivity of substantially 100 percent; and a curved outcoupler mirror at a second end thereof, the curved mirror having a reflectivity of less than 100 percent, and wherein the Q-switch crystal is positioned between the lasing element and the curved mirror.

11. The laser system of claim 9, wherein the lasing element comprises a glass host material.

12. The laser system of claim 9, wherein the means for optically pumping comprises a flash lamp.

13. The laser system of claim 9, wherein the lasing element emits, under stimulation, light at a wavelength of from about 0.95 to about 1.65 micrometers.

14. The laser system of claim 9, wherein the Q-switch crystal host material comprises glass.

15. The laser system of claim 9, wherein the Q-switch crystal comprises $Co^{2+}$-doped yttrium-scandium-gallium garnet.

16. The laser system of claim 9, wherein the Q-switch crystal comprises $Co^{2+}$-doped yttrium-aluminum garnet.

17. A Q-switch for a laser comprising a host material crystal having a sufficient concentration of $Co^{2+}$ ions doped therein to thereby provide a saturable absorber of light of a wavelength of from about 0.95 to about 1.65 micrometers which produces a Q-switch function.

18. The Q-switch of claim 17, wherein the Q-switch crystal comprises $Co^{2+}$-doped garnet.

19. The Q-switch of claim 17, wherein the Q-switch crystal comprises $Co^{2+}$-doped yttrium-scandium-gallium garnet.

20. The Q-switch of claim 17, wherein the Q-switch crystal comprises $Co^{2+}$-doped yttrium-aluminum garnet.

* * * * *